US012689276B2

(12) United States Patent (10) Patent No.: US 12,689,276 B2
Mao et al. (45) Date of Patent: Jul. 21, 2026

(54) VIBRATION MOTOR HAVING A DRIVING UNIT WHICH INCLUDES A SOLENOID ASSEMBLY CAPABLE OF VIBRATING IN A DIRECTION PERPENDICULAR TO A VIBRATION DIRECTION OF A VIBRATION UNIT

(71) Applicant: AAC Microtech (Changzhou) Co., Ltd., Changzhou (CN)

(72) Inventors: Lubin Mao, Changzhou (CN); Yun Tang, Changzhou (CN); Jie Ma, Changzhou (CN)

(73) Assignee: AAG Microtech (Changzhou) Co., Ltd., Changzhou (CN)

( * ) Notice: Subject to any disclaimer, the term of this patent is extended or adjusted under 35 U.S.C. 154(b) by 204 days.

(21) Appl. No.: 18/631,004

(22) Filed: Apr. 9, 2024

(65) Prior Publication Data

US 2025/0202329 A1 Jun. 19, 2025

Related U.S. Application Data

(63) Continuation of application No. PCT/CN2023/139052, filed on Dec. 15, 2023.

(51) Int. Cl.
*H02K 5/24* (2006.01)
*H02K 33/02* (2006.01)
(Continued)

(52) U.S. Cl.
CPC ............... *H02K 33/18* (2013.01); *H02K 5/24* (2013.01); *H02K 33/02* (2013.01); *H02K 33/16* (2013.01)

(58) Field of Classification Search
CPC .......... H02K 5/24; H02K 33/02; H02K 33/06; H02K 33/10; H02K 33/16; H02K 35/02; H02K 33/18
See application file for complete search history.

(56) References Cited

U.S. PATENT DOCUMENTS

2023/0015265 A1* 1/2023 Shi .......................... H02K 33/16

FOREIGN PATENT DOCUMENTS

CN 111082630 A * 4/2020 ............. H02K 33/00
CN 113794349 A * 12/2021 ............. H02K 33/18
(Continued)

OTHER PUBLICATIONS

Ogihara, Machine Translation of WO2019021969, Jan. 2019 (Year: 2019).*

(Continued)

*Primary Examiner* — Eric Johnson
(74) *Attorney, Agent, or Firm* — Wiersch Law Group

(57) ABSTRACT
A vibration motor is disclosed. The vibration motor includes a frame having an upper frame and a lower frame, a vibration unit, a driving unit for driving the vibration unit for vibrating along a first vibration direction, and a pair of first elastic members for elastically supporting the vibration unit. The driving unit includes a solenoid assembly. The lower frame is provided with two second elastic members, and each second elastic member is spaced apart from the lower frame. One end of each second elastic member is fixed to the lower frame, and another end of each second elastic member is fixed to the solenoid assembly. The solenoid assembly is elastically supported by the two second elastic members for being capable to vibrate along a second vibration direction perpendicular to the first vibration direction. The vibration motor can improve the stability.

7 Claims, 3 Drawing Sheets

(51) Int. Cl.
_H02K 33/16_ (2006.01)
_H02K 33/18_ (2006.01)

(56) References Cited

FOREIGN PATENT DOCUMENTS

| | | | | | |
|---|---|---|---|---|---|
| WO | WO-2019021969 | A1 * | 1/2019 | ............ | H02K 33/16 |
| WO | WO-2022062017 | A1 * | 3/2022 | ............ | H02K 33/02 |
| WO | WO-2022206012 | A1 * | 10/2022 | ............ | H02K 33/00 |

OTHER PUBLICATIONS

Liu, Machine Translation of WO2022062017, Mar. 2022 (Year: 2022).*
Zheng, Machine Translation of WO2022206012, Oct. 2022 (Year: 2022).*
Wang, Machine Translation of CN113794349, Dec. 2021 (Year: 2021).*

* cited by examiner

VIBRATION MOTOR HAVING A DRIVING UNIT WHICH INCLUDES A SOLENOID ASSEMBLY CAPABLE OF VIBRATING IN A DIRECTION PERPENDICULAR TO A VIBRATION DIRECTION OF A VIBRATION UNIT

FIELD OF THE PRESENT DISCLOSURE

The present disclosure relates to vibration motors, in particular to a vibration motor used in the field of portable electronic products.

DESCRIPTION OF THE RELATED ART

With the development of electronic technology, portable electronic products are becoming more and more popular, such as mobile phones, handheld game consoles, navigation devices and handheld multimedia entertainment devices. These portable electronic products generally use vibration motors to realize the system feedback, such as phone call prompts, message prompts, navigation prompts and the vibration feedback of handheld game consoles.

A vibration motor in the related art includes a frame having a receiving cavity, a vibration unit received in the receiving cavity and a stator fixed to the frame. The vibration unit includes a weight and a magnet. The stator includes a solenoid assembly electromagnetically interacting with the magnet. Because of assembly tolerances and other factors, the vibration unit has a redundant acceleration component in a direction perpendicular to a desired vibration direction when the vibration unit vibrates, which causes redundant vibrations and affects vibration effects.

Thus, it is necessary to provide a novel vibration motor to solve the problems.

SUMMARY

An objective of the present disclosure is to overcome the above technical problems and provide a vibration motor which can improve the stability.

In order to achieve the objective mentioned above, the present disclosure discloses a vibration motor including a frame having a receiving cavity, a vibration unit received in the receiving cavity, a driving unit received in the receiving cavity for driving the vibration unit for vibrating along a first vibration direction, and a pair of first elastic members respectively disposed on both sides of the vibration unit along the first vibration direction for elastically supporting the vibration unit in the receiving cavity. The frame includes an upper frame and a lower frame engaged with the upper frame for forming the receiving cavity. The driving unit includes a solenoid assembly. The lower frame is provided with two second elastic members, and each second elastic member is spaced apart from the lower frame. One end of each second elastic member is fixed to the lower frame, and another end of each second elastic member is fixed to the solenoid assembly. The solenoid assembly is elastically supported by the two second elastic members for being capable to vibrate along a second vibration direction perpendicular to the first vibration direction.

In some embodiments, the one end of each second elastic member is fixed to the lower frame through a spacer.

In some embodiments, the one end of each second elastic member is fixed to a protrusion of the lower frame.

In some embodiments, each second elastic member has a long strip shape extending along the first vibration direction.

In some embodiments, the solenoid assembly includes an iron core and a coil. The iron core includes two first portions opposite to each other and a second portion connecting the two first portions. The coil is wound on the second portion. The another end of each second elastic member is fixed to a corresponding first portion.

In some embodiments, a damping element is sandwiched between each second elastic member and the lower frame.

In some embodiments, a gap between each second elastic member and the lower frame is full of the damping element.

In some embodiments, the damping element is made of foam.

In some embodiments, the vibration unit includes a weight having a containing space and two magnetic units mounted in the containing space. The two magnetic units are arranged opposite to each other, each of which includes a magnetically conductive plate attached to the weight and a magnet attached to the magnetically conductive plate. The solenoid assembly locates in the containing space and is spaced apart from the two magnetic units.

In the vibration motor according to the present disclosure, the solenoid assembly is elastically supported by the two second elastic members for being capable to vibrate along the second vibration direction perpendicular to the first vibration direction. When the vibration unit generates redundant vibrations in the second vibration direction, by virtue of the two second elastic members, the solenoid assembly can generate the reverse vibrations with the same frequency as the redundant vibrations of the vibration unit, which can reduce the redundant vibrations of the vibration unit in the second vibration direction without affecting the desired vibrations of the vibration unit in the first vibration direction, thereby making the vibration motor can improve the stability.

BRIEF DESCRIPTION OF THE DRAWINGS

In order to more clearly illustrate the technical solutions in embodiments of the present disclosure, the accompanying drawings used in the description of the embodiments will be briefly introduced below. It is apparent that, the accompanying drawings in the following description are only some embodiments of the present disclosure, and other drawings can be obtained by those of ordinary skill in the art based on the accompanying drawings without creative efforts, wherein.

REFERENCE NUMBERS

Figure 1:
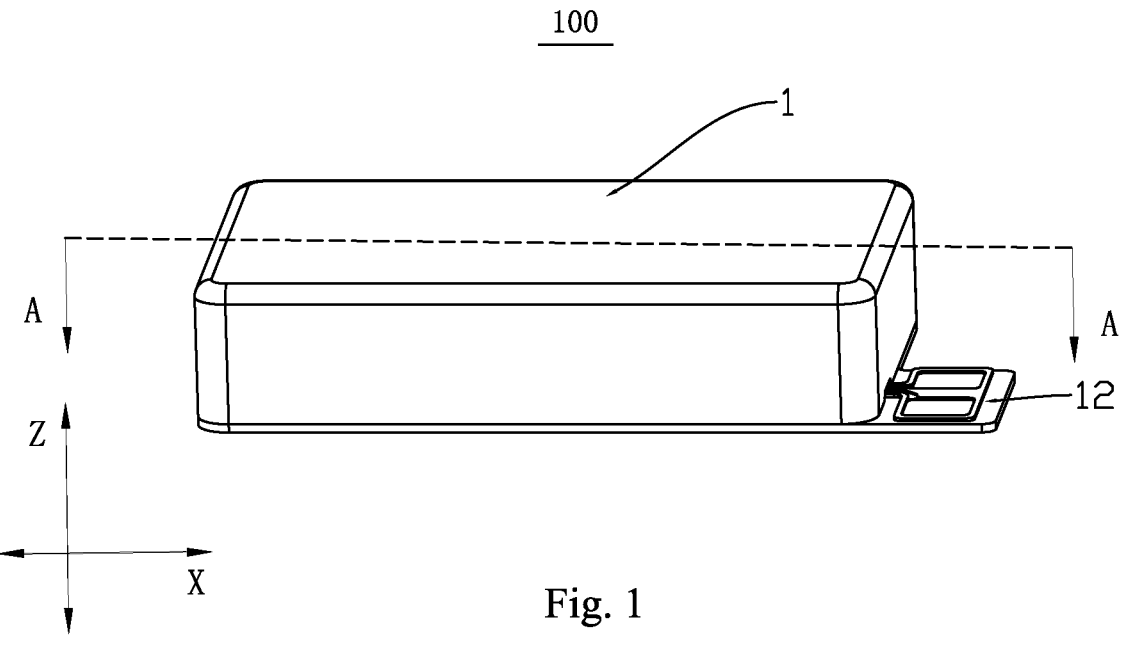
FIG. 1 is an isometric view of a vibration motor in accordance with an exemplary embodiment of the present disclosure.

100/200: vibration motor; 1: frame; 11: upper frame; 12: lower frame; 121: protrusion; 13: receiving cavity; 2: vibration unit; 21: weight; 211: containing space; 22: magnetic unit; 221: magnetically conductive plate; 222: magnet; 3: driving unit; 31: solenoid assembly; 311: iron core; 311a: first portion; 311b: second portion; 312: coil; 32: flexible circuit board; 41: first elastic member; 411: soldering plate; 42: second elastic member; 43: spacer; 44: damping element; 5: damping block; 6: limiting block; X: first vibration direction; Z: second vibration direction.

DETAILED DESCRIPTION OF THE EMBODIMENTS

The technical solutions in embodiments of the present disclosure will be described clearly and completely below with reference to the accompanying drawings in the embodiments of the present disclosure. It is apparent that, the described embodiments are merely some of rather than all of the embodiments of the present disclosure. All other embodiments acquired by those of ordinary skill in the art without creative efforts based on the embodiments of the present disclosure shall fall within the protection scope of the present disclosure.

Referring to FIGS. 1-4, the present disclosure discloses a vibration motor 100 including a frame 1 having a receiving cavity 13, a vibration unit 2 received in the receiving cavity 13, a driving unit 3 received in the receiving cavity 13 for driving the vibration unit 2 for vibrating along a first vibration direction X, and a pair of first elastic members 41 respectively disposed on both sides of the vibration unit 2 along the first vibration direction X for elastically supporting the vibration unit 2 in the receiving cavity 13.

The frame 1 includes an upper frame 11 and a lower frame 12 engaged with the upper frame 11 for forming the receiving cavity 13.

The vibration unit 2 includes a weight 21 having a containing space 211, and two magnetic units 22 mounted in the containing space 211. The two magnetic units 22 are arranged opposite to each other, each of which includes a magnetically conductive plate 221 attached to the weight 21 and a magnet 222 attached to the magnetically conductive plate 221. The magnetically conductive plate 221 is used for converging magnetic fields of the magnet 222, thereby improving magnetic performances of the magnetic unit 22.

The driving unit 3 includes a solenoid assembly 31 and a flexible circuit board 32. The solenoid assembly 31 locates in the containing space 211 and is spaced apart from the two magnetic units 22. The solenoid assembly 31 includes an iron core 311 and a coil 312. The iron core 311 includes two first portions 311a opposite to each other and a second portion 311b connecting the two first portions 311a. The coil 312 is wound on the second portion 311b. The iron core 311 corresponds to the magnets 222. The coil 312 is electrically connected to the flexible circuit board 32. When the coil 312 is energized, electromagnetic interactions between the solenoid assembly 31 and the magnetic units 22 make the vibration unit 2 reciprocate along the first vibration direction X through the pair of first elastic members 41 for providing vibration sensations.

One end of each first elastic member 41 is fixed to the frame 1 through a soldering plate 411, and another end of each first elastic member 41 is fixed to the weight 21 through another soldering plate 411.

Figure 3:
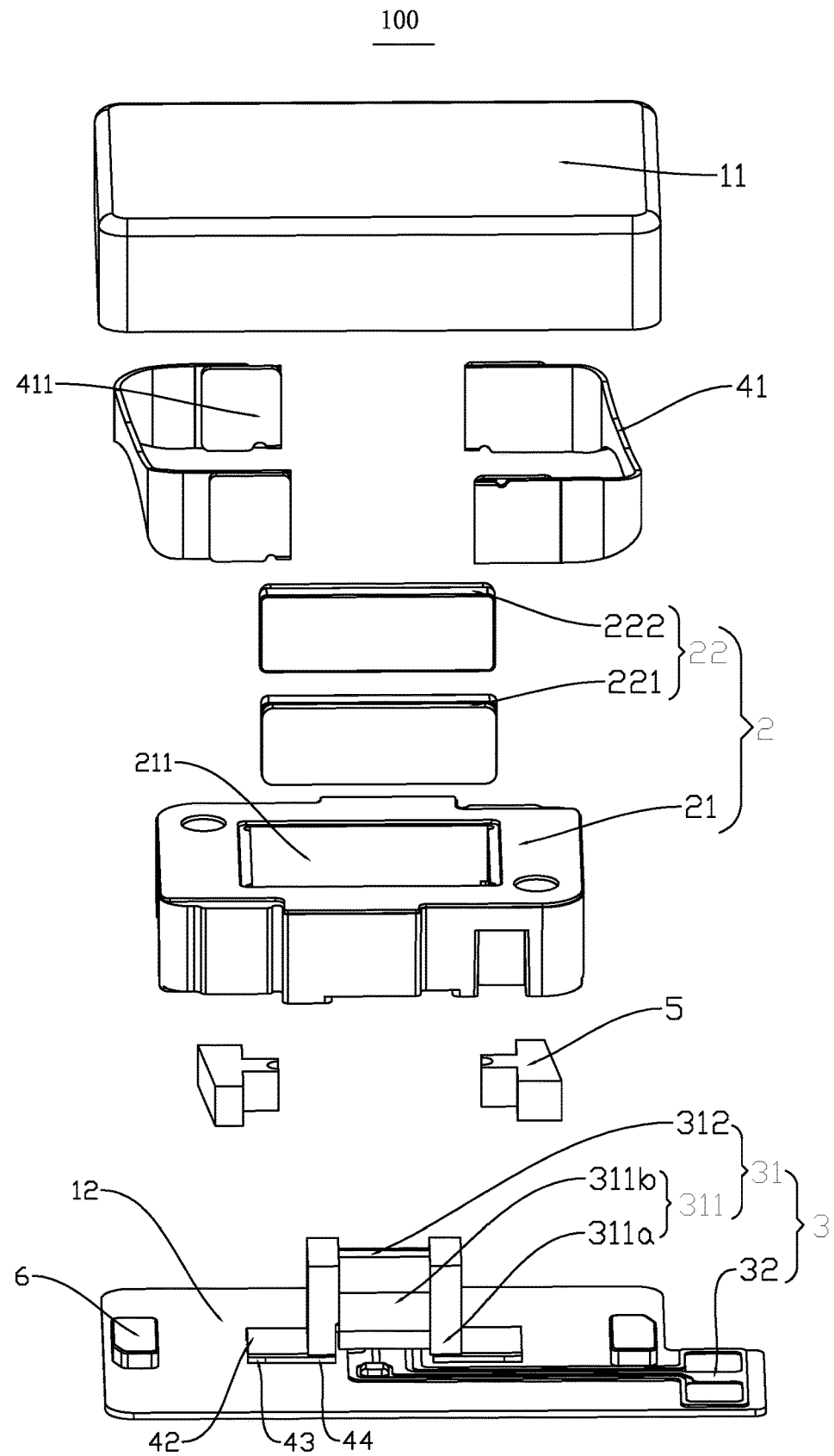
FIG. 3 is an exploded view of the vibration motor in FIG. 1.
Figures 4, 5:
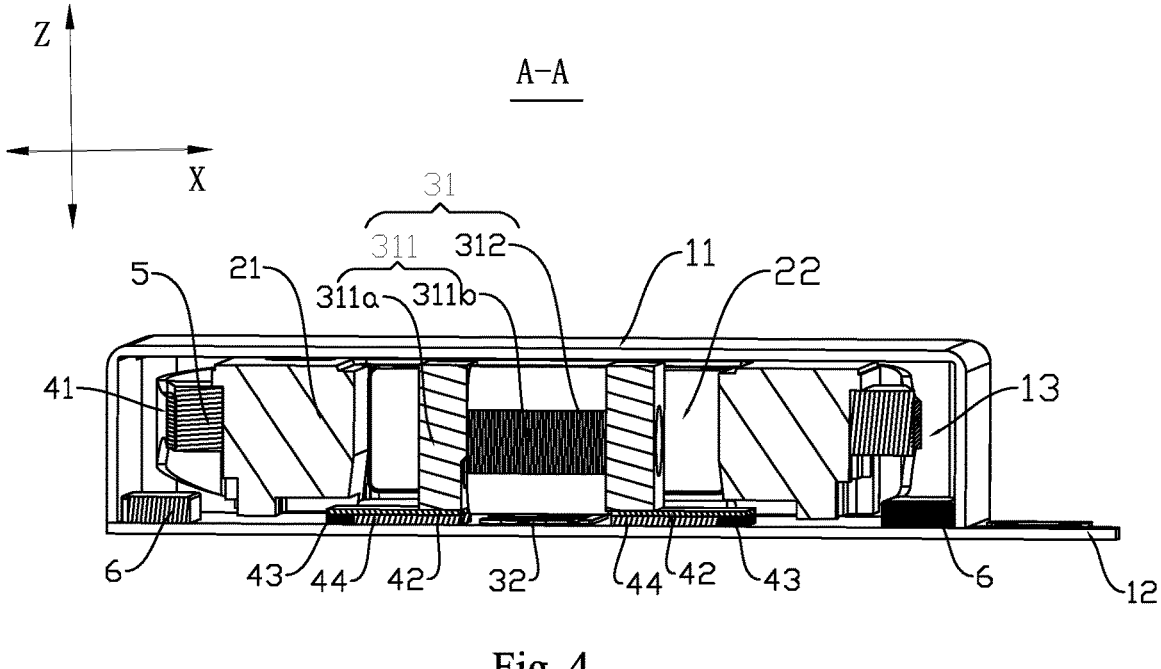
FIG. 4 is a cross-sectional view of the vibration motor, taken along line A-A in FIG. 1.
FIG. 5 is a cross-sectional view of another vibration motor of the present disclosure.

Referring to FIGS. 3-4, the lower frame 12 is provided with two second elastic members 42, and each second elastic member 42 is spaced apart from the lower frame 12. One end of each second elastic member 42 is fixed to the lower frame 12, and another end of each second elastic member 42 is fixed to the solenoid assembly 31. The solenoid assembly 31 is elastically supported by the two second elastic members 42 for being capable to vibrate along a second vibration direction Z perpendicular to the first vibration direction X.

Referring to FIG. 4, each second elastic member 42 has a long strip shape extending along the first vibration direction X. The one end of each second elastic member 42 is fixed to the lower frame 12 through a spacer 43, and the another end of each second elastic member 42 is fixed to a corresponding first portion 311a for elastically supporting the solenoid assembly 31 for making the solenoid assembly 31 can be capable to vibrate along the second vibration direction Z. A damping element 44 is sandwiched between each second elastic member 42 and the lower frame 12 for adjusting a vibration amplitude of the solenoid assembly 31 in the second vibration direction Z. Optionally, a gap between each second elastic member 42 and the lower frame 12 is full of the damping element 44. The damping element 44 may be made of foam, or other damping materials.

Figure 2:
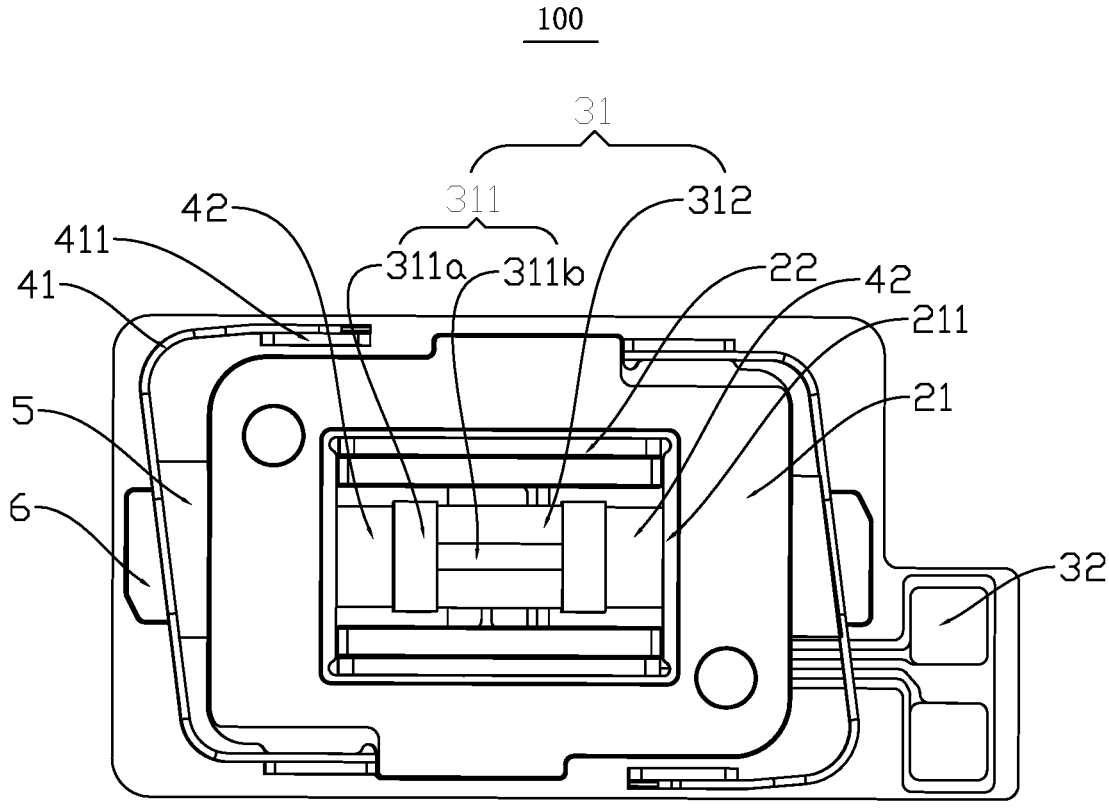
FIG. 2 is a plan view of the vibration motor in FIG. 1, removing an upper frame.

Referring to FIGS. 2-4, in order to prevent collisions and frictions when the vibration unit 2 vibrates, a damping block 5 is arranged between the pair of first elastic members 41 and the weight 21, and further, the lower frame 12 is provided with a limiting block 6 for limiting a vibration amplitude of the vibration unit 2 in the first vibration direction X.

Referring to FIG. 5, the present disclosure discloses another vibration motor 200, the vibration motor 200 differs from the vibration motor 100 in that the spacer 43 is replaced with a protrusion 121 of the lower frame 12. The one end of each second elastic member 42 is fixed to the protrusion 121 of the lower frame 12, and the another end of each second elastic member 42 is fixed to a corresponding first portion 311a for elastically supporting the solenoid assembly 31 for making the solenoid assembly 31 can be capable to vibrate along the second vibration direction Z. A damping element 44 is sandwiched between each second elastic member 42 and the lower frame 12 for adjusting a vibration amplitude of the solenoid assembly 31 in the second vibration direction Z. Optionally, a gap between each second elastic member 42 and the lower frame 12 is full of the damping element 44. The damping element 44 may be made of foam, or other damping materials.

In the vibration motor 100/200 according to the present disclosure, the solenoid assembly 31 is elastically supported by the two second elastic members 42 for being capable to vibrate along the second vibration direction Z perpendicular to the first vibration direction X. When the vibration unit 2 generates redundant vibrations in the second vibration direction Z, by virtue of the two second elastic members 42, the solenoid assembly 31 can generate the reverse vibrations with the same frequency as the redundant vibrations of the vibration unit 2, which can reduce the redundant vibrations of the vibration unit 2 in the second vibration direction Z without affecting the desired vibrations of the vibration unit 2 in the first vibration direction X, thereby making the vibration motor 100/200 can improve the stability.

The above are only embodiments of the present disclosure. It should be pointed out that those of ordinary skill in the art may also make improvements without departing from the ideas of the present disclosure, all of which fall within the protection scope of the present disclosure.

What is claimed is:

1. A vibration motor, comprising:
   a frame having a receiving cavity, comprising an upper frame and a lower frame engaged with the upper frame for forming the receiving cavity;
   a vibration unit received in the receiving cavity;
   a driving unit received in the receiving cavity for driving the vibration unit for vibrating along a first vibration direction, comprising a solenoid assembly; and a pair of first elastic members respectively disposed on both sides of the vibration unit along the first vibration direction for elastically supporting the vibration unit in the receiving cavity;

wherein, the lower frame is provided with two second elastic members, each second elastic member is spaced apart from the lower frame, one end of each second elastic member is fixed to the lower frame, and another end of each second elastic member is fixed to the solenoid assembly, the solenoid assembly is elastically supported by the two second elastic members for being capable to vibrate along a second vibration direction perpendicular to the first vibration direction, the solenoid assembly comprises an iron core and a coil, the iron core comprises two first portions opposite to each other along the first vibration direction and a second portion extending along the first vibration direction and connecting the two first portions, an orthographic projection area of each first portion along the first vibration direction is greater than that of the second portion along the same direction, the coil is wound on the second portion, the two second elastic members are disposed on the same side of the iron core along the second vibration direction and close to the lower frame, the another end of each second elastic member is fixed to an end of a corresponding first portion along the second vibration direction and close to the lower frame, the vibration unit comprises a weight having a containing space and two magnetic units mounted in the containing space, the two magnetic units are arranged opposite to each other along a direction perpendicular to the first vibration direction and the second vibration direction, each magnetic unit comprises a magnetically conductive plate attached to the weight and a magnet attached to the magnetically conductive plate, the solenoid assembly is inserted between and spaced apart from the two magnets.

2. The vibration motor as described in claim 1, wherein the one end of each second elastic member is fixed to the lower frame through a spacer.

3. The vibration motor as described in claim 1, wherein the one end of each second elastic member is fixed to a protrusion of the lower frame.

4. The vibration motor as described in claim 1, wherein each second elastic member has a long strip shape extending along the first vibration direction.

5. The vibration motor as described in claim 1, wherein a damping element is sandwiched between each second elastic member and the lower frame.

6. The vibration motor as described in claim 5, wherein a gap between each second elastic member and the lower frame is full of the damping element.

7. The vibration motor as described in claim 5, wherein the damping element is made of foam.

\* \* \* \* \*